Patented Mar. 29, 1949

2,465,476

UNITED STATES PATENT OFFICE 2,465,476

TRACTOR LOADING ATTACHMENT

Stephen S. Pokorny, Rutland, and Herman E. Luebbers, Fort Dodge, Iowa

Application September 6, 1946, Serial No. 695,268

2 Claims. (Cl. 214—140)

This invention relates to the material handling and moving art and more particularly to material moving mechanisms for attachment to tractors and the like.

It is an object of the invention to provide a mechanism for attachment to a tractor and employing a jack whereby the pressure system of the tractor may be applied for raising and transporting loads of material, scooped up during forward movements of the tractor, more efficiently than with the devices of the prior art.

Another object of the invention is to provide a material moving mechanism which provides more leverage than heretofore for raising loads of material.

A further object of the invention is to provide a mechanism as described which elevates the material more rapidly than heretofore.

A still further object of the invention is to provide a mechanism as described, the parts of which, when assembled in combination with a tractor and in a normal position, do not extend above the engine or any portion of the tractor whereby the vehicle and the new mechanism may be driven through comparatively low doorway openings of sheds, barns and the like without a removal of the new mechanism from the tractor.

A further object of the invention is to provide a material moving mechanism which is so constructed and the parts thereof so cooperatively assembled with respect to each other that a lesser number of parts is necessary than heretofore, for obtaining the desired results.

Other and still further objects and advantages of the invention will become apparent from the following detailed description of a preferred embodiment thereof taken with reference to the accompanying drawings in which.

Figure 1:
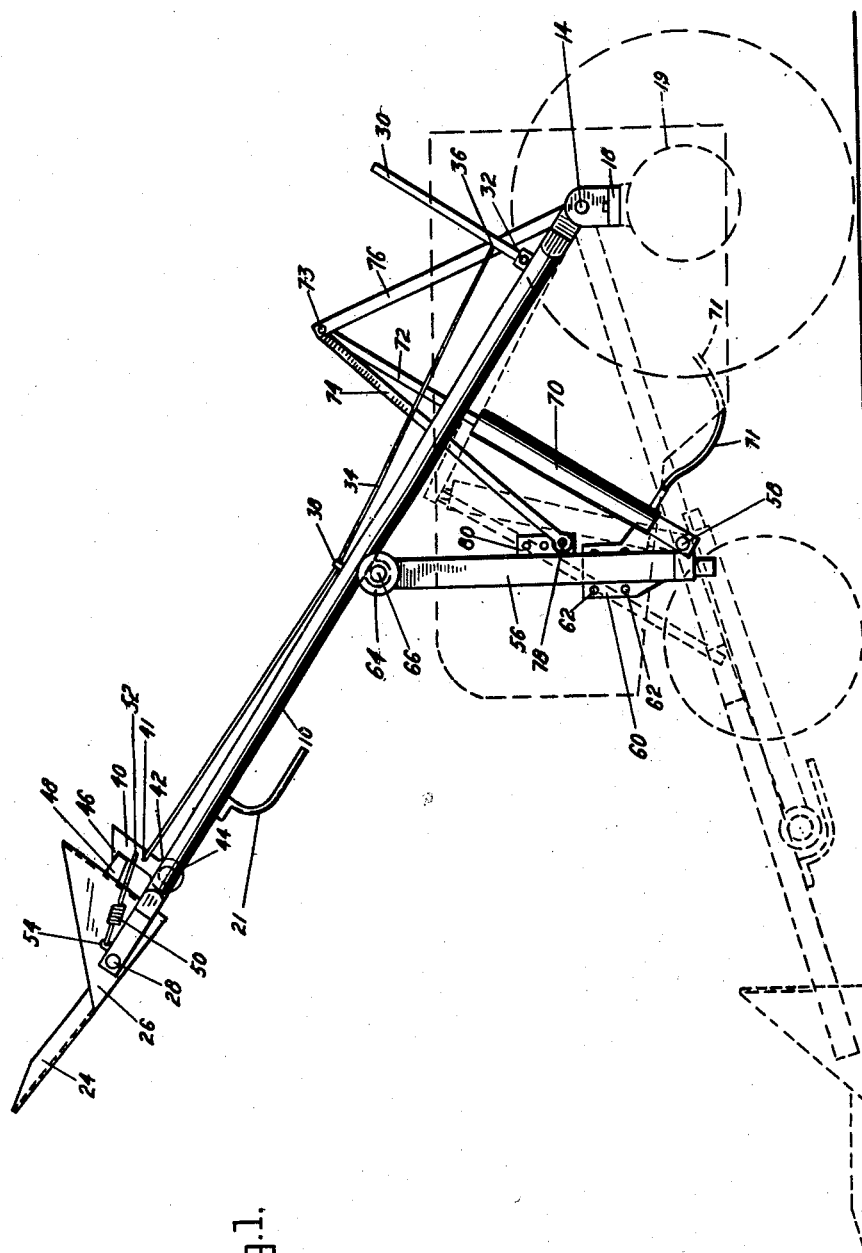
Figure 1 is a side elevation of a tractor, shown in dotted lines, with the material moving mechanism of this invention attached thereto, the said mechanism being shown in full lines in an elevated position and in dotted lines in the lowered position.
Figure 2:
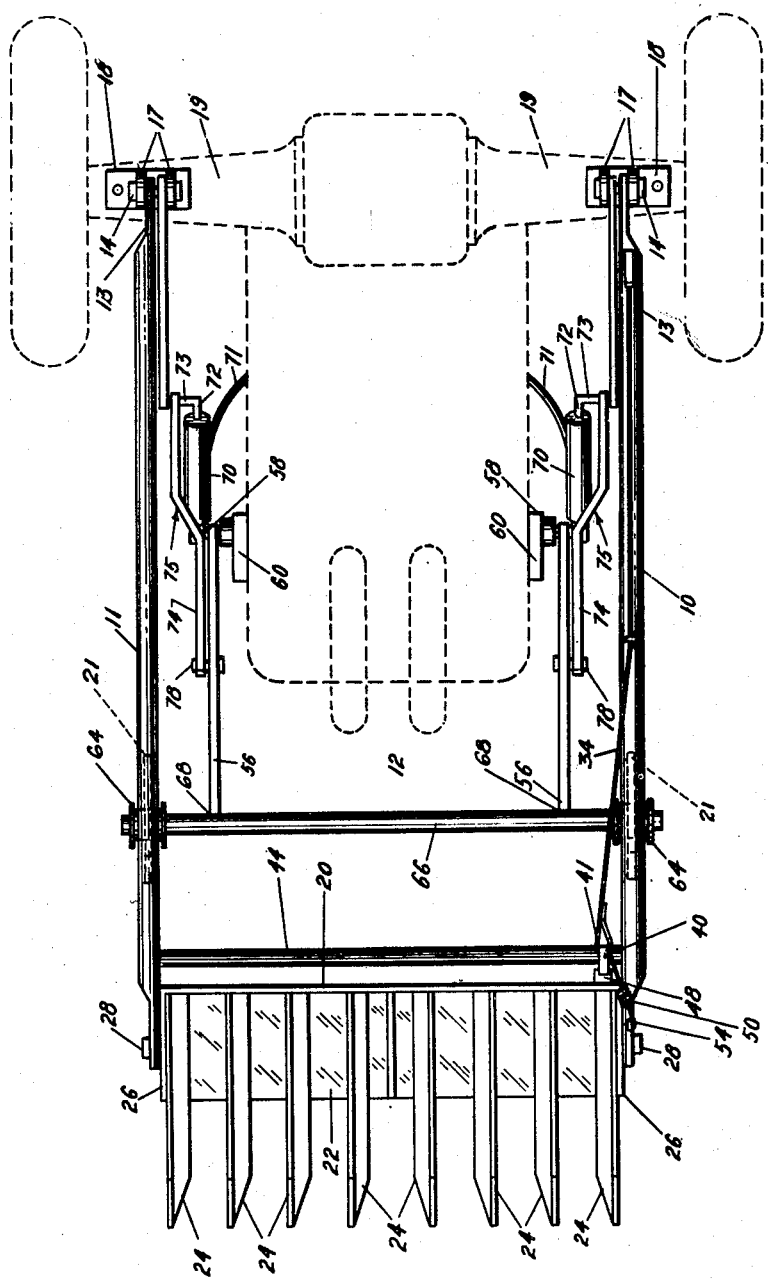
Figure 2 is a top plan view of the mechanism and tractor of Figure 1, the material loading mechanism being shown in a normal or down position.
Figure 3:
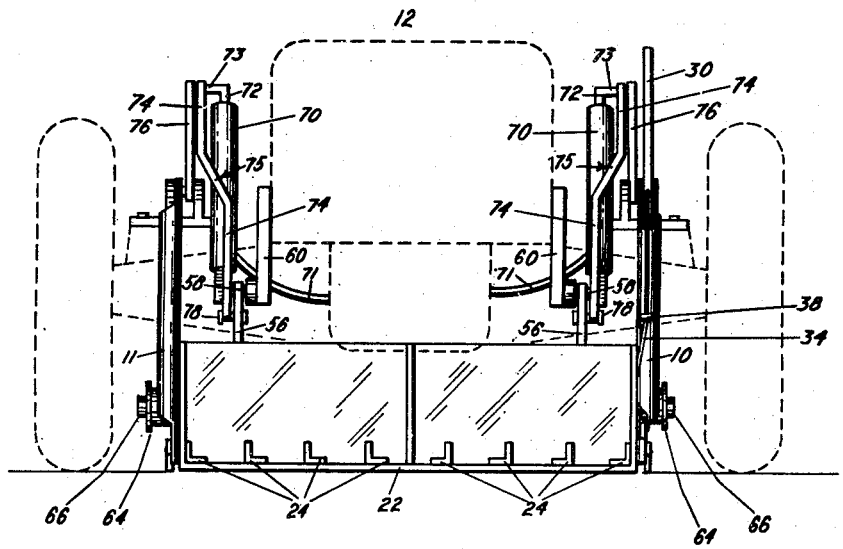
Figure 3 is a frontal elevation of the tractor and loading mechanism in the positions as shown in Figure 2.

The device of this invention includes two like rails 10 and 11 which are oppositely disposed respectively at the sides of the tractor, the latter being indicated generally at 12. The tractor is illustrated in dotted outline throughout the several views since the said tractor may be of any one of several conventional types and therefore is believed not to require any particular description or illustration herein.

The flattened ends 13 of the rails 10 and 11 are pivotally mounted on pivot pins, as at 14, and are each fitted in a pair of supports composed of upstanding apertured ears 17 attached to the horizontal footings 18, the apertures in the ears 17 being for the admission of the pins 14.

As best shown in Figure 1, the footings 18 of the supports are secured by any suitable means such as bolts, welding or the like, not shown, to the rear axle housing 19 of the tractor 12.

It will be understood that, if desired, the rearwardly disposed ends 13 of the rails 10 and 11 may be attached respectively to the rear axle housing 19 of the tractor 12 by any suitable means to allow vertical swinging movements.

In order to maintain the forward ends of the rails 10 and 11 in spaced relation with respect to the surface of the ground, a pair of spacing members 21 are attached to the forward ends of the rails 10 and 11, the rearward ends of the spacing members 21 being constructed so as to extend parallel to the ends of the rails 10 and 11 and at a selected spaced relation therefrom.

Between the forward ends of the rails 10 and 11, a scoop is provided including a rearward wall 20 and a bottom 22. If desired, tines 24 may be employed in conjunction with the scoop, being secured by any suitable means to the bottom 22 and extending forwardly thereof. The scoop further includes oppositely disposed side walls 26.

A pair of stub axles 28 are disposed through the rails 10 and 11 and are suitably secured to the side walls 26 of the scoop. If desired, the axles 28 may be threadedly or otherwise provided with means, not shown, for locking the scoop in a pre-determined position with respect to the rails 10 and 11, as would be advantageous for certain types of work.

For types of work in which it is desirable to change the angle of the scoop with respect to the rails 10 and 11, a lever mechanism for this purpose is provided. The said lever mechanism includes a lever 30 pivotally attached by means of a bolt 32 to the rearward end of one of the rails 10 or 11 and within easy reach of the operator of the tractor. A rod or cable 34 is attached to the lever 30 at a point 36 between the ends thereof, the rod or cable 34 extending forwardly along the rail 10 and through a guide eyelet 38 secured to the top of the rail 10, the rod or cable 34 extending forwardly.

At its forward end the rod or cable 34 is attached, as at 41, adjacent the mid-section of a latch member 40, the latch member 40 being attached to a bearing 42 at its lower end.

The bearing 42 is provided with an aperture of a size adapted to rotate about a round connecting rod 44; the latter extends between and interconnects the outer ends of the rails 10 and 11, said rod being positioned just rearwardly of the rear wall 20 of the bucket.

A latch hook 46 extends forwardly from the upper end of the latch 40 and is adapted to engage about a nib 48, the nib 48 being securely attached to one side of the rearward wall 20 of the bucket. In order to hold the latch hook 46 in position above the nib 48, a spring 50 is attached to the latch hook 46 at a point 52 approximately midway between its ends and is attached at its forward end by means of a tab 54 to the forward end of the rail 10.

Means for raising the rails 10 and 11 to cause the bucket to lift material are provided by this invention and include a pair of rail raising members 56 positioned at either side of the tractor 12 and pivotally attached to the sides of the tractor 12 by means of the pivot pins 58 which interconnect the rail raising members 56 and the side hanger brackets 60, the said side hanger brackets being bolted or otherwsie suitably secured to the forward ends of the sides of the tractor 12 by any suitable means such as the bolts 62.

The outer ends of the rail raising members 56 are provided with means for slidably engaging the rails 10 and 11. Preferably the said engaging means comprises a pair of rollers 64, each of the rollers 64 being positioned atop and offset to the outside of the rail raising members 56 and the rollers 64 are pivotally secured to the rail raising members by means of an axle rod 66 which is attached by any suitable means to the upper ends of the rail raising members 56 as indicated at 68. Preferably the axle member 66 extends transversely of and interconnects the upper ends of the rail raising members 56.

Means are provided for causing the rail raising members 56 to define pivotal movements about the pins 58 in order to raise the rails 10 and 11 and such means includes a pair of hydraulic jacks 70. The hydraulic jacks 70 are similarly pivotally connected to the hanger brackets 62 by means of the pivot pins 58. The cylinders of the jacks 70 are connected to the pressure system of the tractor 12 by means of the flexible hoses 71.

The plungers 72 of the jacks 70 are each pivotally connected to one of a pair of struts 74 and one of a pair of jack positioning bars 76. Such connection is made by means of the transversely extending members 73 attached to the upper ends of the plungers 72 and which form a pivotal attachment for the upper ends of the struts 74 and the jack positioning bars 76.

The struts 74 extend forwardly toward the rail positioning bars 56 and preferably are each provided with an offset portion 75 which extends forwardly and inwardly so that the rearward ends of the struts 74 will be positioned adjacent the outer sides of the jacks 70 while the forward ends of the struts 74 will be positioned closely adjacent the outside of the rail raising members 56. The forward ends of each of the struts 74 are pivotally connected as by means of one of the pins 78 and one of the rail raising member tabs 80 to a point adjacent the mid-section of each of the rail raising members 56.

The jack positioning bars 76 are each pivotally connected at their lower ends to the pins 14 which also hold the rearward ends of the rails 10 and 11.

As thus described, it will be seen that each strut 74 and its corresponding jack positioning bar 76, together form a flexible means for causing the jack 70 to raise the rail-raising member 56 upon expansion of the jack. It is the attachment of the forward end of the jack positioning member 76 to the jack 70 which causes the upper or rearward end of the jack 70 to be positioned at all times during operation rearwardly of the rail-raising member 56 for providing greatest leverage.

In operation, the rails 10 and 11 will be held in the position shown in full lines in Figure 1 during traveling movements and at times when the scoop is either empty or full.

When it is desired to pick up a load of hay or other material, the operator will lower the scoop by permitting pressure to be released from the pressure system of the tractor 12, thus releasing pressure from the jacks 70 and permittnig the rail raising members 56 to move forwardly. When the rails 10 and 11 have reached the dotted line position shown in Figure 1, the tractor 12 may be moved forwardly for scooping the load of hay or other material into the scoop. At this time the scoop may be raised by increasing the pressure in the pressure system of the tractor 12 and in the jacks 70.

When the scoop and rails are in the upward position shown in full lines in Figure 1, the scoop may be dumped by pulling rearwardly on the lever 30, thus releasing the latch 40 against the urge of the spring 50, permitting the scoop to rotate counter-clockwise under the influence of gravity and to dump its cargo.

From the foregoing description, it is thought to be obvious that a tractor loading attachment constructed in accordance with our invention is particularly well adapted for use by reason of the convenience and facility with which it may be assembled and operated, and it will also be obvious that our invention is susceptible of some change and modification including variations in the shape and size of the parts without departing from the principles and spirit thereof, and for this reason, we do not wish to be understood as limiting ourselves to the precise arrangement and formation of the several parts herein shown in carrying out our invention in practice, except as claimed.

We claim:

1. In a material moving mechanism for attachment to an upright tractor including material receiving means disposed on front of said tractor; a rail secured to said material receiving means at one end, the other end of said rail being pivotally secured to said tractor; means for raising said rail comprising a rail raising member disposed beneath said boom, said member being pivotally secured to said tractor at one of its ends and being disposed at its other end in slideable engagement with the underside of said rail, said pivotally attached end of said member being disposed forwardly along said tractor from the pivotal attachment between said rail and said tractor; a jack secured to said tractor at one end thereof; a flexible means attached at one end to said rail raising member at a point between the ends of the latter and at its other end to said tractor at a point disposed rearwardly along said tractor from the said one pivotally attached end of said rail raising member, said flexible means being carried by the other end of said jack at a point between the ends of said flexible means so that an expansion of said jack will cause said flexible means to pull said rail raising member upwardly.

2. The construction described in claim 1 in which said flexible means is fixed to said other end of said jack so that said other end is maintained during operation rearwardly positioned along said tractor from said rail raising member.

STEPHEN S. POKORNY.
HERMAN E. LUEBBERS.

REFERENCES CITED

The following references are of record in the file of this patent:

UNITED STATES PATENTS

| Number | Name | Date |
| --- | --- | --- |
| 947,964 | Collins | Feb. 1, 1910 |
| 2,336,390 | Boll | Dec. 7, 1943 |
| 2,371,273 | Walker | Mar. 13, 1945 |
| 2,377,112 | Strunk | May 29, 1945 |
| 2,387,656 | Gledhill | Oct. 23, 1945 |
| 2,395,622 | Galbreath | Feb. 26, 1946 |
| 2,415,892 | Koehl et al. | Feb. 18, 1947 |